United States Patent [19]
Manschitz et al.

[11] Patent Number: 4,655,464
[45] Date of Patent: Apr. 7, 1987

[54] DRILL CHUCK FOR A HAND-HELD DEVICE

[75] Inventors: Erwin Manschitz, Germering; Karl-Heinz Gärtner, Schöngaising; Josef Hunger, Olching; Manfred Spieth, Martinsried, all of Fed. Rep. of Germany; Hans-Karl Moser, Tisis; Jürgen Mündle, Satteins, both of Austria

[73] Assignee: Hilti Aktiengesellschaft, Fürstentum, Liechtenstein

[21] Appl. No.: 736,473

[22] Filed: May 21, 1985

[30] Foreign Application Priority Data

May 21, 1984 [DE] Fed. Rep. of Germany ....... 3418881

[51] Int. Cl.⁴ .......................................... B23B 31/12
[52] U.S. Cl. ................................... 279/64; 279/1 K; 279/60
[58] Field of Search ............... 279/1 K, 60, 61, 62, 279/63, 64, 19, 19.1, 19.2, 19.3–19.7; 409/234; 173/132

[56] References Cited

U.S. PATENT DOCUMENTS

| 3,677,657 | 7/1972 | Brucker | 279/1 K |
|---|---|---|---|
| 4,083,571 | 4/1978 | Schadlish et al. | 279/61 |
| 4,213,622 | 7/1980 | Rohm | 279/60 |
| 4,213,623 | 7/1980 | Rohm | 279/60 |
| 4,266,789 | 5/1981 | Wahl et al. | 279/60 |
| 4,395,170 | 7/1983 | Clarey | 279/62 |
| 4,418,927 | 12/1983 | Rohm | 279/1 K |
| 4,563,013 | 1/1986 | Hunger et al. | 279/60 |

FOREIGN PATENT DOCUMENTS

2826153 12/1979 Fed. Rep. of Germany ........ 279/19

Primary Examiner—Z. R. Bilinsky
Assistant Examiner—A. Dougas
Attorney, Agent, or Firm—Toren, McGeady and Goldberg

[57] ABSTRACT

In a drill chuck for securing the shank of a tool in a hand-held device, clamping jaws are mounted in a chuck member and bear radially outwardly against the conically shaped surface in a first sleeve into which the tool shank is inserted. A second sleeve is connected to the first sleeve and is threaded engagement with the chuck member. A locking or third sleeve is located about the first and second sleeves. The third sleeve is axially displaceable between a first position and a second position. In the first position the third sleeve engages the first and second sleeves so that the second sleeve cannot be rotated relative to the first sleeve or the chuck member and the tool shank can be locked by the clamping jaws. When the third sleeve is displaced into the second position, the second sleeve is released and can be rotated relative to the chuck member for axially displacing the first sleeve relative to the chuck member and adjusting the radial position of the clamping jaws.

10 Claims, 2 Drawing Figures

DRILL CHUCK FOR A HAND-HELD DEVICE

BACKGROUND OF THE INVENTION

The present invention is directed to a drill chuck for a hand-held device, such as a percussion drill, a drill hammer or the like for securing the shank of a tool. The drill chuck includes at least two clamping jaws supported in a chuck member so that the jaws can be radially displaced and adjusted to the diameter of the tool shank inserted into the chuck. A first sleeve is mounted on the chuck member and has a conically shaped surface in contact with the clamping jaws. The chuck member and the first sleeve are interconnected so that they do not rotate relative to one another but the first sleeve is axially displaceable relative to the chuck member. A second sleeve is connected with the first sleeve and is in threaded engagement with the chuck member. Gear teeth are formed on the second sleeve and a gear teeth key can be engaged with the teeth on the second sleeve for rotating the second sleeve about the chuck member.

Particularly in the field of percussion drills, drill chucks are known which have radially adjustable clamping jaws. As a rule, such clamping jaws are radially adjusted by a rotatable sleeve having a conical surface so that the jaws can receive and hold substantially cylindrically shaped shank ends of tools of various diameters. Since the tool shanks in such drill chucks are clamped only in a force-locking manner, such drill chucks are not suitable for drill hammers in which substantially higher stresses are developed. While in percussion drills only vibrational movement is transmitted to the tool shank, in drill hammers or chisel devices a hammering action is transmitted to the end of the tool shank. Accordingly, drill chucks which afford a form-locking engagement of the tool shank have been successful in drill hammers and chisel devices. In such chucks, radially adjustable elements cooperate with stop surfaces on the shank end of the tool. The full effectiveness of such devices can only be achieved when the tool shank is held in the chuck with a limited amount of play. Therefore, a relatively difficult task is imposed on the drill chuck in which the shank end of a tool is guided within the chuck and now requires radially adjustable elements for affording axial and radial support at corresponding stop faces on the tool shank. With regard to the tools, this problem led to providing extremely uneconomical dimensioning of the tools, since the shank end of the tool had to be provided which was either too large for smaller tool diameters or too small for larger tool diameters.

SUMMARY OF THE INVENTION

Therefore, the primary object of the present invention is to avoid the disadvantages set forth above by providing a drill chuck which can accept and hold tool shanks of different diameters in a form-locking manner which is suitable for use in drill hammers and is also usable for the force locking engagement of tools, such as in percussion drills.

In accordance with the present invention, an axially displaceable locking sleeve is arranged for interconnecting an adjusting sleeve with a sleeve having a conical surface against which the clamping jaws are secured. The locking sleeve is displaceable between two end positions so that in one end position the adjusting sleeve and other sleeve with the conical surface are not rotatable relative to one another and in the other end position the adjusting sleeve is rotatable relative to the other sleeve for effecting radial adjustment of the clamping jaws.

To adjust the drill chuck, in accordance with the present invention, the interconnection of the adjusting sleeve and the other sleeve must be released so that they are rotatable relative to one another. The releasing action is effected by the axial displacement of the locking sleeve between its end positions. With the locking sleeve displaced so that adjustment can be effected, the adjusting sleeve can be rotated until the desired locking engagement of the tool shank is achieved. After the desired adjustment is effected, the locking sleeve can be returned to its locking position with the adjusting sleeve and the other sleeve connected together whereby the adjustment of the clamping jaw in the drill chuck is maintained including any required play or force-locking action.

To adjust the sleeve which secures the clamping jaws and to prevent any release of the jaws during operation, it is advisable if the locking sleeve is locked in its end positions. The locking action can be effected by an annular spring, a ball catch or the like. A relatively high torque is required for the force-locking of a tool shank in the chuck. To apply such high torque it is conventional to provide the sleeve holding the clamping jaws or the adjusting sleeve with conical gear teeth for engagement with a key having correspondingly shaped teeth. Such a gear tooth arrangement is susceptible, however, to the penetration of dirt. To protect the gear teeth against the accumulation of dirt and to keep the risk of any damage low, it is advantageous if the conical gear teeth located on the adjusting sleeve and the receiving opening or recess in the other sleeve for the gear tooth key is covered by the locking sleeve in the end position where the adjusting sleeve is non-rotatably connected to the other sleeve. By axially displacing the locking sleeve from the position where the gear teeth are covered, the gear teeth become accessible and adjustment can be effected. After the drill chuck is adjusted, the locking sleeve can be returned to the end position for blocking access to the gear teeth on the adjusting sleeve.

The locking sleeve can be supported on the adjusting sleeve or on the other sleeve with the conical surface which supports the clamping jaws. For practical reason, however, it is preferred if the locking sleeve is supported on the other sleeve so that it is non-rotatable but axially displaceable relative to the other sleeve. In continued use of the device, the clamping jaws and, as a result the sleeve supporting the jaws, become heated due to the percussive energy transmitted to the shank end of the tool. Such heat makes it difficult to adjust the drill chuck. By means of the locking sleeve enclosing the sleeve supporting the clamping jaws, the temperature on the exterior of the drill chuck is substantially reduced. Such heat reduction is particularly effective when the locking sleeve is formed of a poor heat conducting material, such as a plastics material.

The locking sleeve can be connected with the adjusting sleeve by a simple groove-cam connection. The fine adjustability of the drill chuck is limited by a small number of grooves. Therefore, it is advantageous for the optimum adjustment of the drill chuck to the diameter of the inserted shank end of a tool if the locking sleeve has teeth which can be made to engage within corresponding counterteeth on the adjusting sleeve. Although different forms of interengaging teeth are possible, it is preferable if the teeth extend in the axial direction of the sleeves.

Since the locking device affords only a securing or safety function, the forces acting on it are relatively small. Therefore, it is advisable for a compact construction of the drill chuck that the teeth on the locking sleeve and the counterteeth on the adjusting sleeve be formed as serrations. Apart from affording simple production, the serrations have the advantage of affording a fine adjustment of the drill chuck.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention

DETAILED DESCRIPTION OF THE INVENTION

Figure 1:
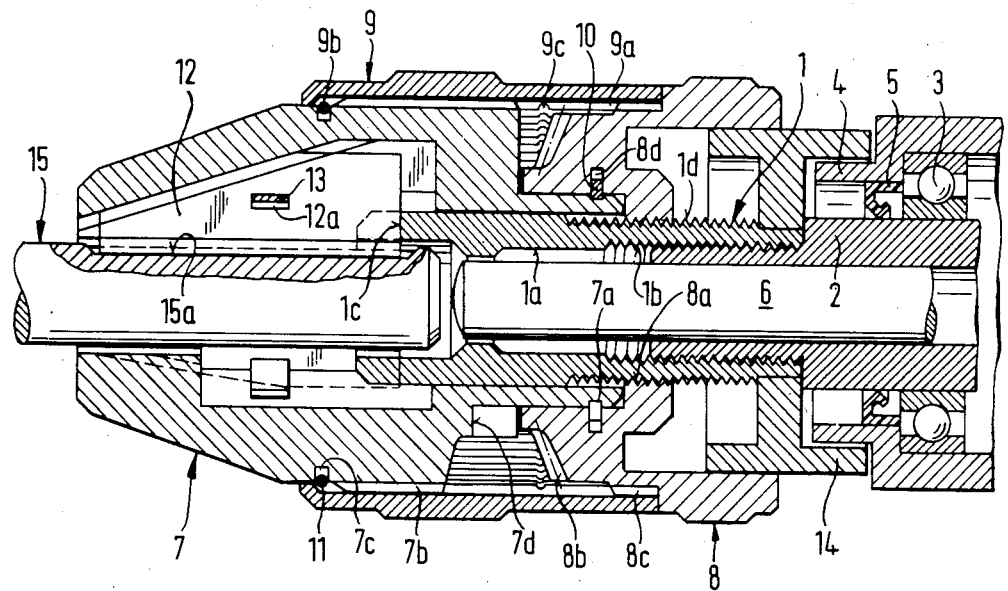
FIG. 1 is an axially extending sectional view of a drill chuck embodying the present invention and shown in the locked position.
Figure 2:
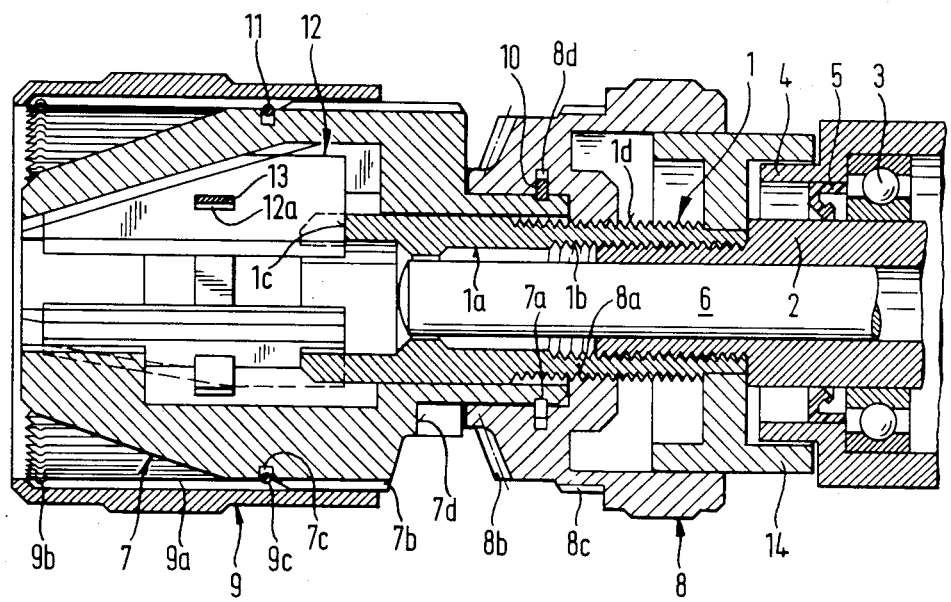
FIG. 2 is an axially extending sectional view as shown in FIG. 1, however, with the drill chuck in the unlocked position.

In FIGS. 1 and 2 a tubular or sleeve-shaped chuck member 1 forms an axially extending hole 1a with a stepped diameter surface. As viewed in FIGS. 1 and 2 the left-hand end of the various components of the drill chuck are the front ends and the right-hand ends are the rear ends. In the rear part of the axial borehole 1a adjacent the device on which the drill chuck is mounted, an interior thread 1b is formed and a hollow spindle 2 is screwed into the thread 1b. Spindle 2 is supported in a housing 4 of the drilling device by a roller bearing 3. A sealing ring 5 is located in the front end of the device laterally encircling the spindle 2 and sealing off the roller bearing 3. An anvil 6 is axially displaceably supported within the hollow spindle 2. A first sleeve 7 is mounted on and extends forwardly from the front end of the chuck member 1. The first sleeve 7 has an axially extending conically shaped or inwardly tapering surface. The first sleeve 7 is supported on the chuck member 1 so that it is not rotatable but is axially displaceable relative to the chuck member. An adjusting or second sleeve 8 is located rearwardly of the first sleeve 7 and is connected with the first sleeve so that it is rotatable but not axially displaceable relative to it. The second sleeve is provided with an axially extending thread 8a which is in threaded engagement with an exterior thread 1d on the chuck member 1. Accordingly, the adjusting or second sleeve 8 and the first sleeve 7 connected with it can be displaced axially relative to the chuck member 1 by rotating the second sleeve about the chuck member due to the interengagement of the threads 1d, 8a.

In FIG. 1, the first sleeve 7 and the second sleeve 8 are connected together by an axially displaceable locking or third sleeve 9 located radially outwardly from and encircling the first and second sleeves. The third sleeve 9 is provided with teeth 9a on its interior surface which mesh with corresponding teeth 7b, 8c on the outside surfaces of the first sleeve 7 and the second sleeve 8. The teeth 9a, 7b, 8c extend in the axial direction.

In addition, the adjusting or second sleeve 8 is connected with the first sleeve 7 by a resilient securing ring 10 extending radially and seated within a recess 8d in the second sleeve and an annular groove 7a in the first sleeve. A radially deformable spring ring 11 is located in an annular catch groove 7c on the outside surface of the first sleeve 7. The spring ring 11 is engageable within catches 9b, 9c spaced axially apart in the inside surface of the locking or third sleeve 9. The catches 9b, 9c secure the third sleeve 9 in its two end positions as shown in FIGS. 1 and 2 and prevent any unintentional axial displacement of the third sleeve.

Within the first sleeve 7, axially extending clamping jaws 12 are located supported at their rear ends in axially extending slots 1c in the front end of the member 1. The clamping jaws 12 are arranged to be radially displaceable. Each clamping jaw 12 has an opening 12a therethrough in which an annular spring 13 is positioned which biases the clamping jaws radially outwardly against the conically shaped or inwardly tapering surface on the inside of the first sleeve 7. The radially outer axially extending edges of the clamping jaws 12 engage within grooves on the inside surface of the first sleeve 7 so that the first sleeve 7 is non-rotatably connected with the chuck member 1 via the clamping jaws 12. A labyrinth ring 14 is located at the rear end of the drill chuck adjacent the device on which the chuck is mounted. Labyrinth ring 14 prevents the infiltration of dust and drillings into the drill chuck as well as to the region of the sealing ring 5.

For the adjustment of the second sleeve 8, the sleeve is provided with a conically shaped arrangement of teeth 8b adjacent its front end. The first sleeve 7 has an opening or recess 7d adjacent its rear end for receiving a gear tooth key, known per se, and not illustrated. Preferably, the opening or recess 7d is in the form of a groove opened at the rear end of the first sleeve 7. Such an arrangement affords an economical production of the first ring by extrusion. The gear tooth key is supported on three sides within the opening 7d in the first sleeve 7 on the fourth side on the juxtaposed surface adjacent the front end of the second sleeve 8, that is, the teeth 8b.

In the position illustrated in FIG. 1, the shank end 15 of a tool is inserted into the drill chuck through an opening formed by the front end of the first sleeve 7. The shank end 15 is provided with axial extending grooves 15a in which the clamping jaws 12 engage in a form-locking manner. It is possible, however, to clamp tool shanks with smooth, that is, unindented shank ends in the same drill chuck by providing the friction-locking engagement between the radially inner edges of the clamping jaw and the surface of the shank end 15. In the position illustrated in FIG. 1, the adjusting or second sleeve 8 is locked with the chuck member 1 so that it cannot be rotated relative to the chuck member due to the arrangement of the locking or third sleeve 9, the first sleeve 7 and the clamping jaws 12. The opening 7d for the gear teeth key as well as for the gear teeth 8b on the second sleeve, are covered in the end position shown in FIG. 1 by the third sleeve 9 and, as a result, are protected against the penetration of dirt.

To change the tool held in the drill chuck, the third sleeve 9 is pushed axially in the direction of the front end of the drill chuck in which the tool is held into the second end position shown in FIG. 2. In the axial displacement of the third sleeve 9 into the second position, it is held in this end position by the interengagement of the spring ring 11 in the catch grooves 9c. With the opening 7d and the gear teeth 8b uncovered, the second sleeve 8 can be rotated relative to the chuck member 1 and the first sleeve 7. Axial displacement of the first sleeve is afforded by rotating the second sleeve 8 about its threaded engagement with the chuck member 1. Depending on the direction in which the chuck member is axially displaced, the radially outer edges of the clamping jaws 12 contacting the inside surface of the first sleeve 7 are displaced radially. The adjustment of the third sleeve 8 can be carried out manually, or by means of the gear tooth key inserted into the opening 7b so that it is in meshed engagement with the gear teeth 8b on the adjusting or second sleeve 8. After adjusting the clamping jaws to the diameter of the inserted tool shank 15, the third sleeve 9 is returned to its original position in FIG. 1 and the second sleeve 8 is locked. With the return of the third sleeve 9 back into the position in FIG. 1, the teeth on its inside surface engage with the teeth on the outside surface of the second sleeve preventing any rotation of the second sleeve. In the locking position or end position shown in FIG. 1, the third sleeve is held by the spring ring 11 engaged in the catch 9b.

While specific embodiments of the invention have been shown and described in detail to illustrate the application of the inventive principles, it will be understood that the invention may be embodied otherwise without departing from such principles.

We claim:

1. Drill chuck for a hand-held device, such as a percussion drill, a drill hammer, for retaining a tool in the device comprising an axially extending tubular chuck member, at least two clamping jaws mounted in said chuck member and being radially displaceable relative to the axis of said chuck member, said chuck member having an axially extending inner edge and an axially extending outer edge with the inner and outer edge being spaced apart in the radial direction, an axially extending first sleeve in general axial alignment with said chuck member, said first sleeve has a first end and a second end and laterally encloses said clamping jaws and has an inside axially extending surface tapered relative to the axis thereof with the radially outer edges of said clamping jaws arranged to contact said tapered surfaces, said first end of said first sleeve arranged to receive a tool shank to be secured in said drill chuck, said first sleeve being axially displaceable and non-rotatable relative to said chuck member, an axially extending second sleeve in general axial alignment with said first sleeve and extending around and disposed in threaded engagement with said chuck member, said second sleeve having a first end and a second end with said first end thereof located adjacent the second end of said first sleeve and with the second end thereof spaced from the first end in the direction opposite to the first end of said first sleeve, gear teeth located adjacent the first end of said second sleeve, a radially inner extending recess in said first sleeve adjacent the second end thereof and said recess being open toward said gear teeth on said second sleeve so that a gear tooth key can be inserted into said recess into meshed engagement with said gear teeth on said second sleeve, an axially extending third sleeve in general axial alignment with said first and second sleeves and positioned radially outwardly from said first and second sleeves, said third sleeve being axially displaceable relative to said first and second sleeves between a first position and a second position, said second sleeve being non-rotatable relative to said first sleeve in the first position of said third sleeve and being rotatable relative to said first sleeve in the second position of said third sleeve.

2. Drill chuck, as set forth in claim 1, including means for locking said third sleeve in said first and second positions.

3. Drill chuck, as set forth in claim 2, wherein said means comprise an annular groove in the outside surface of said first sleeve, a spring ring mounted in said annular groove, first catches and second catches spaced axially apart on the inside surface of said third sleeve with said spring ring engageable within said first and second catches.

4. Drill chuck, as set forth in claim 1, wherein in the first position of said third sleeve said third sleeve covers said opening in said first sleeve and said gear teeth on said second sleeve.

5. Drill chuck, as set forth in claim 1, including means for preventing the rotation of said third sleeve relative to said first sleeve while affording axial displacement of said third sleeve relative to said first sleeve.

6. Drill chuck, as set forth in claim 5, wherein said means for preventing rotation of said third sleeve relative to said first sleeve comprises axially extending teeth on the inside surface of said third sleeve and corresponding axially extending teeth on the outside surface of said first sleeve with said teeth on said third and first sleeves being in meshed engagement so that axial displacement of said third sleeve relative to said first sleeve is afforded while rotational displacement is prevented.

7. Drill chuck, as set forth in claim 6, wherein said teeth on said third sleeve and first sleeve are formed by serrated surfaces on said third sleeve and first sleeve.

8. Drill chuck, as set forth in claim 1, including means interconnecting said first sleeve and second sleeve for affording rotational displacement of said second sleeve relative to said first sleeve.

9. Drill chuck, as set forth in claim 8, wherein said means for interconnecting said first and second sleeves comprises a groove formed in the radially outwardly facing surface of said first sleeve, a corresponding groove formed in the radially inwardly facing surface of said second sleeve and a resilient ring extending between said grooves for affording rotation of said second sleeve relative to said first sleeve while preventing axial displacement between said first and second sleeves.

10. Drill chuck, as set forth in claim 1, including means on said first sleeve for engaging said clamping jaws and preventing rotation of said first sleeve relative to said clamping jaws.

* * * * *